United States Patent
Awano et al.

(10) Patent No.: US 9,689,471 B2
(45) Date of Patent: Jun. 27, 2017

(54) AUTOMATIC TRANSMISSION

(71) Applicant: TOYOTA JIDOSHA KABUSHIKI KAISHA, Toyota-shi, Aichi-ken (JP)

(72) Inventors: Shogo Awano, Toyota (JP); Takuya Ito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/028,535

(22) PCT Filed: Oct. 3, 2014

(86) PCT No.: PCT/IB2014/002253
§ 371 (c)(1),
(2) Date: Apr. 11, 2016

(87) PCT Pub. No.: WO2015/052576
PCT Pub. Date: Apr. 16, 2015

(65) Prior Publication Data
US 2016/0252163 A1 Sep. 1, 2016

(30) Foreign Application Priority Data
Oct. 11, 2013 (JP) .................................. 2013-213795

(51) Int. Cl.
*F16H 57/021* (2012.01)
*F16C 35/077* (2006.01)
*F16H 3/66* (2006.01)

(52) U.S. Cl.
CPC ........... *F16H 3/663* (2013.01); *F16C 35/077* (2013.01); *F16H 57/021* (2013.01); *F16H 2200/0052* (2013.01); *F16H 2200/2007* (2013.01); *F16H 2200/2023* (2013.01); *F16H 2200/2043* (2013.01)

(58) Field of Classification Search
CPC .... F16H 3/663; F16H 57/021; F16H 61/0265; F16H 2200/0052; F16H 57/10; F16H 2200/2007; F16H 2200/2023; F16H 2200/2043; F16C 35/077
USPC .......................................... 192/85.39, 85.42
See application file for complete search history.

(56) References Cited

U.S. PATENT DOCUMENTS 7,524,258 B2 *  4/2009  Onishi ................... F16H 57/08
                                                      475/136
2004/0231457 A1 * 11/2004  Miyazaki ................ F16H 3/663
                                                      74/665 R

FOREIGN PATENT DOCUMENTS

| JP | 2006-009930 A | 1/2006 |
| JP | 2007-132421 A | 5/2007 |
| JP | 2009-124822 A | 6/2009 |

* cited by examiner

*Primary Examiner* — Terry Chau
(74) *Attorney, Agent, or Firm* — Oliff PLC

(57) ABSTRACT

A first retaining ring is disposed between a first outer circumferential groove provided in an outer circumferential surface of a radial bearing, and an inner circumferential groove of a cylindrical portion of a transmission case. A ring piece is provided with an outer ring of the radial bearing. The ring piece protrudes outward in a radial direction and is in contact with an output gear side end surface of the cylindrical portion in the axial direction. A return spring urges the piston in a direction opposite to a direction in which the pressure is applied by the piston. The return spring is retained in the axial direction by a second retaining ring. The second retaining ring is locked in a second outer circumferential groove of the ring piece.

5 Claims, 5 Drawing Sheets

AUTOMATIC TRANSMISSION

BACKGROUND OF THE INVENTION

1. Field of the Invention

The present invention relates to an automatic transmission that is mounted on a vehicle such as a car.

2. Description of Related Art

In an automatic transmission disclosed in Japanese Patent Application Publication No. 2007-132421 (JP 2007-132421 A), an output gear is supported by a cylindrical portion of a transmission case through a radial bearing.

Outer circumferential teeth of the output gear are teeth of a helical gear. The radial bearing is a double row angular contact ball bearing, and is located with respect to the cylindrical portion of the transmission case in a shaft direction. The radial bearing is located using a retaining ring. The retaining ring is locked across an outer circumferential groove that is provided in an outer circumferential surface of an outer ring of the radial bearing, and an inner circumferential groove that is provided in an inner circumferential surface of the cylindrical portion of the transmission case.

A piston that applies a pressure to friction engaging elements (brake) that control gear shifting is slidably fitted to an exterior of a radial bearing support region in the cylindrical portion of the transmission case. Further, a return spring that urges the piston in a direction to separate the piston from the friction engaging elements when no pressure is applied is disposed in the support region of the cylindrical portion of this transmission case. This return spring is retained by the retaining ring that is locked in the outer circumferential groove of the cylindrical portion of the transmission case.

SUMMARY OF THE INVENTION

A configuration disclosed in above JP 2007-132421 A has the following concerns. Generally, the transmission case is made of aluminum alloy to reduce the weight of the transmission case. The two retaining rings are made of ferrous metal to secure sufficient strength. Therefore, there is a concern that the inner circumferential groove and the outer circumferential groove of the cylindrical portion of the transmission case are easily abraded over time.

The present invention provides an automatic transmission that prevents durability of the transmission case from lowering by preventing abrasion of locking grooves for a retaining ring that locates a radial bearing and preventing abrasion of a locking groove for a retaining ring that retains a return spring.

An aspect of the present invention is an automatic transmission. The automatic transmission includes an output gear, a radial bearing, a transmission case, a cylindrical boss portion, a friction engaging element, a piston, a first retaining ring, a ring piece, a second retaining ring and a return spring. The transmission case includes a cylindrical portion. The cylindrical boss portion protrudes from the output gear to a direction in which a thrust force of the output gear is produced. The cylindrical boss portion is supported by the cylindrical portion of the transmission case through the radial bearing to rotate. The friction engaging element is disposed such that the output gear is located between the radial bearing and the friction engaging element. The piston is configured to apply a pressure that causes the friction engaging element to be engaged. The piston is disposed on an outer diameter side of the cylindrical portion of the transmission case. The piston is disposed to slide in an axial direction. The first retaining ring is disposed between a first outer circumferential groove that is provided in an outer circumferential surface of the radial bearing, and an inner circumferential groove that is provided in an inner circumferential surface of the cylindrical portion of the transmission case. The ring piece is provided to an outer ring of the radial bearing. The ring piece protrudes outward in a radial direction. The ring piece is in contact with an output gear side end surface of the cylindrical portion of the transmission case in the axial direction. The second retaining ring is configured to lock in the a second outer circumferential groove that is provided in an outer circumferential surface of the ring piece. The return spring is disposed on an outer circumference of the ring piece. The return spring is configured to urge the piston in a direction opposite to a direction in which the pressure is applied by the piston when the piston stops applying the pressure that causes the friction engaging element to be engaged. The return spring is retained in the axial direction by the second retaining ring.

According to the above aspect, the thrust force that is produced by the output gear is received by the cylindrical portion of the transmission case through the ring piece of the outer ring of the radial bearing. Consequently, the thrust force stops acting on the first ring or acts on the first ring little. Consequently, even when the transmission case is made of aluminum alloy to reduce the weight of the transmission case and the first ring is made of ferrous metal to secure strength, the inner circumferential groove of the cylindrical portion of the transmission case in which the first ring is locked is not easily abraded over time.

Consequently, it is possible to prevent abrasion of locking grooves (the outer circumferential groove of the outer ring and the inner circumferential groove of the transmission case) for the first retaining ring. Consequently, it is possible to prevent durability of the transmission case from lowering.

According to the above aspect, the radial bearing may be a double row angular contact ball bearing. The first outer circumferential groove may be disposed in center of the outer circumferential surface of the radial bearing in the axial direction. The output gear may include outer circumferential teeth that are teeth of a helical gear. A cylindrical boss portion of this output gear may be coaxially disposed on an outer diameter side of an input shaft. The piston may include a bottomed cylindrical shape. A center line of the bottomed cylindrical shape may be coaxially disposed with respect to a center axial line of the input shaft. The return spring may be a disk spring. An outer rim of the return spring may be in contact with a cylindrical portion of the piston. An inner rim of the return spring may be in contact with the second retaining ring.

In this regard, a model of the radial bearing, a configuration and a disposition mode that cause the output gear to produce the thrust force, a shape and a disposition mode of the piston, and a shape and a disposition mode of the return spring are specified.

According to the above aspect, strength of the ring piece of the outer ring may be higher than strength of the cylindrical portion of the transmission case.

According to the above aspect, a reaction force of the urging force applied from the return spring to the piston acts on the second retaining ring. However, a mode that the second retaining ring is locked in the outer circumferential groove of the ring piece of the outer ring with higher strength than that of the cylindrical portion of the transmission case. Consequently, even when, for example, the second retaining ring is made of ferrous metal to secure strength, the outer circumferential groove of the ring piece of the outer ring is not easily abraded over time. According to the above aspect, an outer rim of the return spring may be in contact with a vicinity of a corner between a cylindrical portion and a bottom portion of the piston.

According to the aspect of the present invention, the automatic transmission according to the present invention can prevent abrasion of the locking grooves (the outer circumferential groove of the outer ring and the inner circumferential groove of the transmission case) for the retaining ring that locates the radial bearing that receives a thrust force from the output gear. As a result, it is possible to prevent durability of the transmission case from lowering.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The best embodiment that implements the present invention will be described in detail with reference to the accompanying drawings.

FIGS. 1 to 5 illustrate an embodiment of the present invention. A schematic configuration of an automatic transmission of a front engine front drive (FF) that is a target to apply the present invention will be described with reference to FIG. 1 prior to description of features of the present invention.

Figure 1:
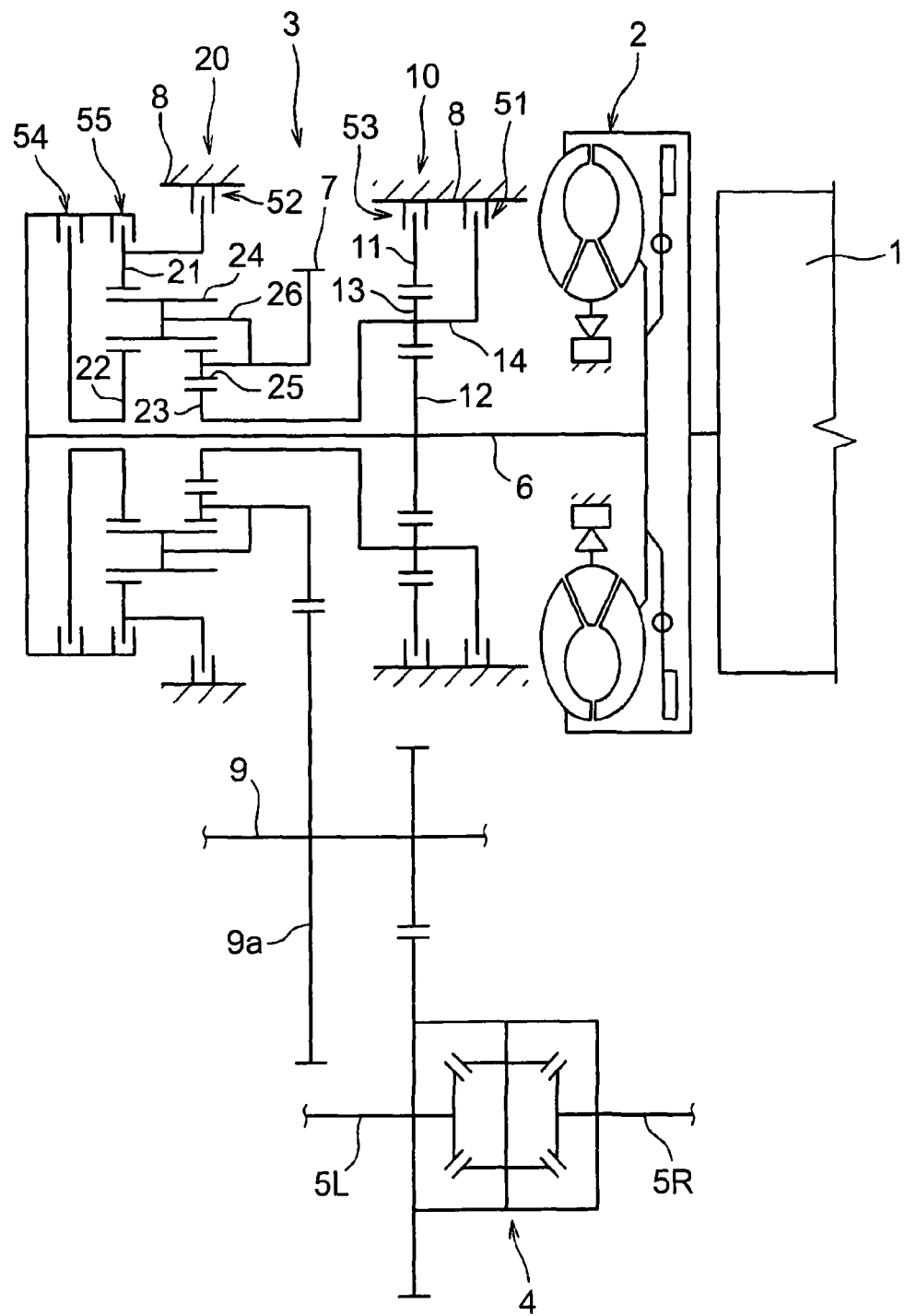
FIG. 1 is a skeleton view that illustrates a schematic configuration of an automatic transmission according to an embodiment of the present invention.

FIG. 1 illustrates an engine 1 (internal combustion). An output of this engine 1 is transmitted to an automatic transmission 3 through a torque converter 2, and is transmitted to left and right drive wheels that are not illustrated through a differential 4 and a pair of axles 5L and 5R.

The automatic transmission 3 is configured to cause a coaxially disposed first gear shift portion 10 and second gear shift portion 20 to change a rotation speed of an input shaft 6, and cause an output gear 7 to transmit an output. The automatic transmission 3 is configured to shift six front gears and one back gear.

The output gear 7 enmeshes with a counter gear 9a that is provided to a counter shaft 9 to rotate together. Rotative power is transmitted from this counter shaft 9 to the differential 4.

The first gear shift portion 10 is mainly configured as a planetary gear mechanism of a single pinion that is configured to include a ring gear 11, a sun gear 12, multiple pinion gears 13, and a carrier 14.

The ring gear 11 is connected to a transmission case 8 through a third brake 53. The ring gear 11 is placed in a state where the ring gear 11 is fixed to a transmission case 8 by the third brake 53 or in an idling state where the ring gear 11 can relatively rotate with respect to the transmission case 8 by the third brake 53. The sun gear 12 is connected to the input shaft 6 to rotate together, and is driven to rotate together with the input shaft 6.

The multiple pinion gears 13 are respectively supported rotatably by the carrier 14, and respectively meshed with the ring gear 11 and the sun gear 12. The carrier 14 is connected to the transmission case 8 through a first brake 51. The carrier 14 is placed in a state where the carrier 14 is fixed to the transmission case 8 by the first brake 51 or in an idling state where the carrier 14 can relatively rotate with respect to the transmission case 8 by the first brake 51.

The second gear shift portion 20 is mainly configured as a planetary gear mechanism of a Ravignaux type that includes a single ring gear 21, two sun gears 22 and 23, long pinion gears 24, short pinion gears 25 and a single carrier 26.

The ring gear 21 is connected to the transmission case 8 through a second brake 52. The ring gear 21 is placed in a state where the ring gear 21 is fixed to the transmission case 8 by the second brake 52 or in an idling state where the ring gear 21 relatively rotates with respect to the transmission case 8 by the second brake 52. Further, the ring gear 21 is placed in a state where the ring gear 21 is connected to the input shaft 6 by a second clutch 55 to rotate together or in an idling state where the ring gear 21 relatively rotates with respect to the input shaft 6 by a second clutch 55.

The first sun gear 22 is connected to the input shaft 6 through a first clutch 54. The first sun gear 22 is placed in a state where the first sun gear 22 is connected to the input shaft 6 by the first clutch 54 to rotate together or in an idling state where the first sun gear 22 can relatively rotate with respect to the input shaft 6 by the first clutch 54. The sun gear 23 is connected to the carrier 14 of the first gear shift portion 10 by way of spline fitting to rotate together.

The multiple long pinion gears 24 and the multiple short pinion gears 25 are respectively supported rotatably by the carrier 14. The multiple long pinion gears 24 respectively mesh with the ring gear 21 and the first sun gear 22. The multiple short pinion gears 25 respectively mesh with the multiple long pinion gears 24 and the second sun gear 23. The carrier 26 is connected to the output gear 7 to rotate together.

The first brake 51, the second brake 52, third brake 53, the first clutch 54 and the second clutch 55 are friction engaging elements of a multiple disk type though not illustrated in detail. One of the six front gears and one back gear of the automatic transmission 3 is shifted when the first brake 51, the second brake 52, third brake 53, the first clutch 54 and the second clutch 55 are engaged or disengaged by a source that actuates, for example, a hydraulic cylinder that is not illustrated.

Figure 2:
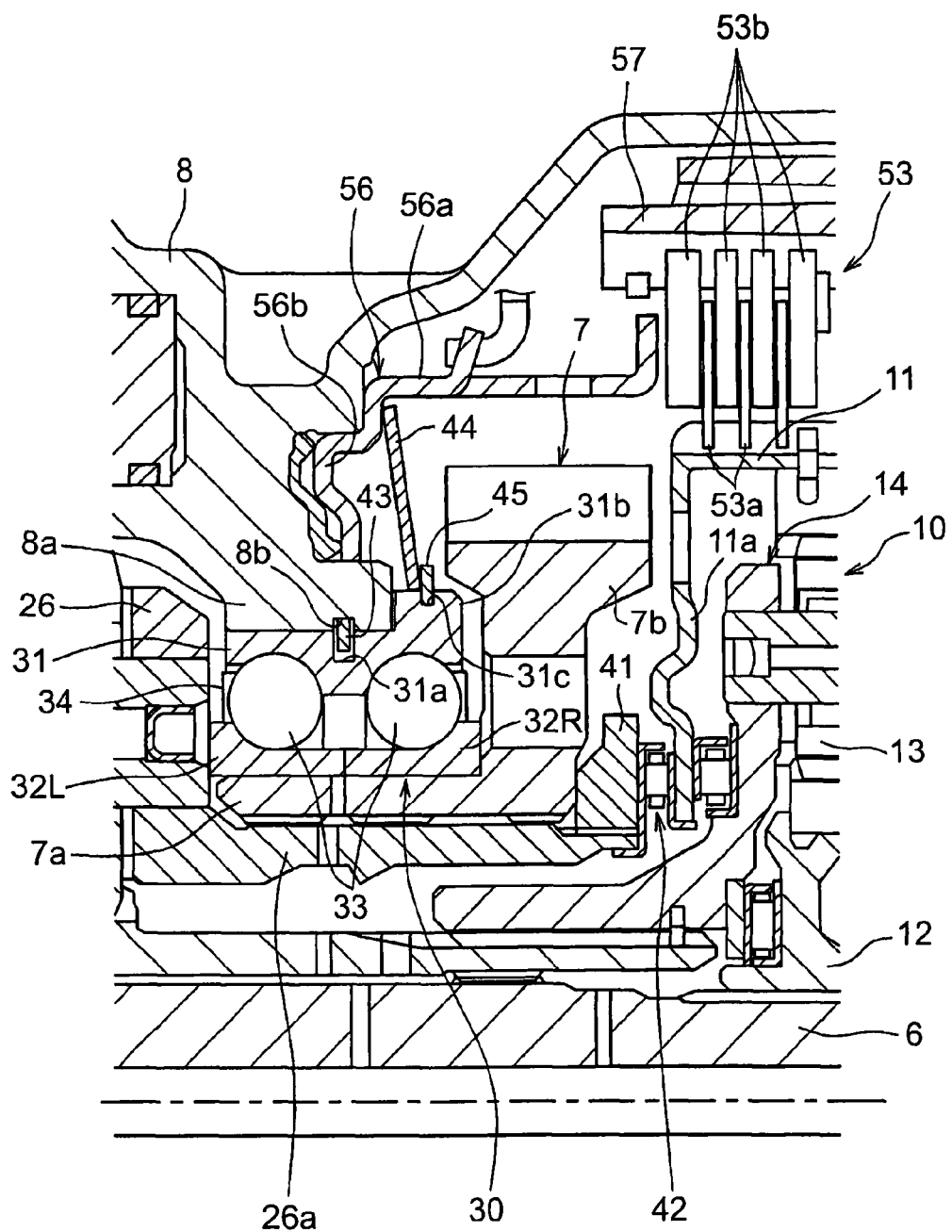
FIG. 2 is a vertical cross-sectional view that illustrates main portions of the automatic transmission in FIG. 1.

As illustrated in FIG. 2, the output gear 7 is rotatably supported by a cylindrical portion 8a of the transmission case 8 through a radial bearing 30. This output gear 7 is configured such that a gear portion 7b is integrally provided on a axial direction one end side of a cylindrical boss portion 7a and is oriented outward in a radial direction. The cylindrical boss portion 7a of the output gear 7 is connected to a cylindrical shaft portion 26a of the carrier 26 of the second gear shift portion 20 by way of spline fitting to rotate together. A lock nut 41 is screwed to this cylindrical shaft portion 26a to locate the output gear 7 with respect to the carrier 26 in the axial direction. A thrust bearing 42 is interposed between the lock nut 41 and an annular disk portion 11a of the ring gear 11 of the first gear shift portion 10. Outer circumferential teeth of the gear portion 7b are teeth of a helical gear, and meshes with the counter gear 9a provided to the counter shaft 9 to rotate together. The radial bearing 30 is a double row angular contact ball bearing. The radial bearing 30 includes an outer ring 31, two inner rings 32L and 32R, multiple balls 33 and a retainer 34. This radial bearing 30 is located with respect to the cylindrical portion 8a of the transmission case 8 in the axial direction. The radial bearing 30 is located by locking a first retaining ring 43 across an outer circumferential groove 31a and the inner circumferential groove 8b. The outer circumferential groove 31a is disposed in center of the outer circumferential surface of the radial bearing 30 in the axial direction.

The inner circumferential groove 8b is provided in an inner circumferential surface of the cylindrical portion 8a of the transmission case 8. The first retaining ring 43 is disposed between the outer circumferential groove 31a and the inner circumferential groove 8b. This first retaining ring 43 is generally called a snap ring. This snap ring has a circumference and elastically expands and contracts. One portion of the circumference is disconnected.

Figure 3:
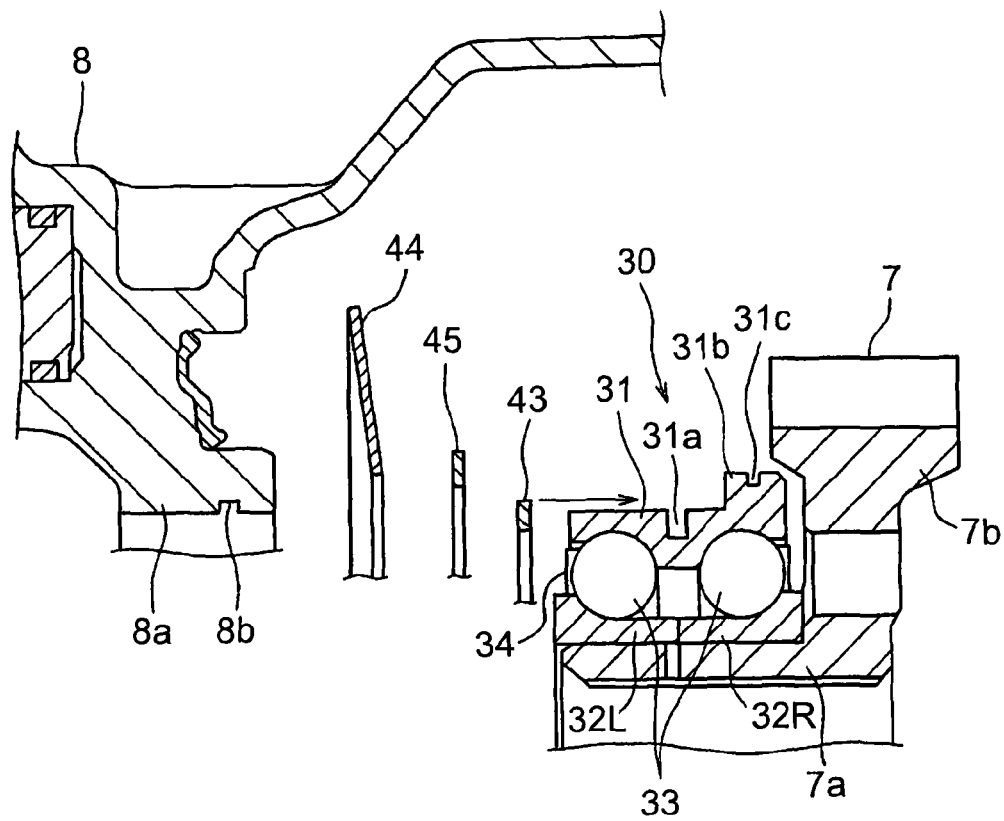
FIG. 3 is a view that explains a process of assembling a radial bearing illustrated in FIG. 2, and illustrates a first stage.

A mode to assemble the first retaining ring 43 that is called the snap ring will be described. As illustrated in FIG. 3, before the outer ring 31 is assembled to the cylindrical portion 8a of the transmission case 8, the first retaining ring 43 is fitted into the outer circumferential groove 31a of this outer ring 31 in a state where the diameter of the first retaining ring 43 is increased. Then, the first retaining ring 43 elastically restores and reduces the diameter, and therefore the first retaining ring 43 fits into the outer circumferential groove 31a and part of the first retaining ring 43 protrudes outward from the outer circumferential groove 31a.

Figure 4:
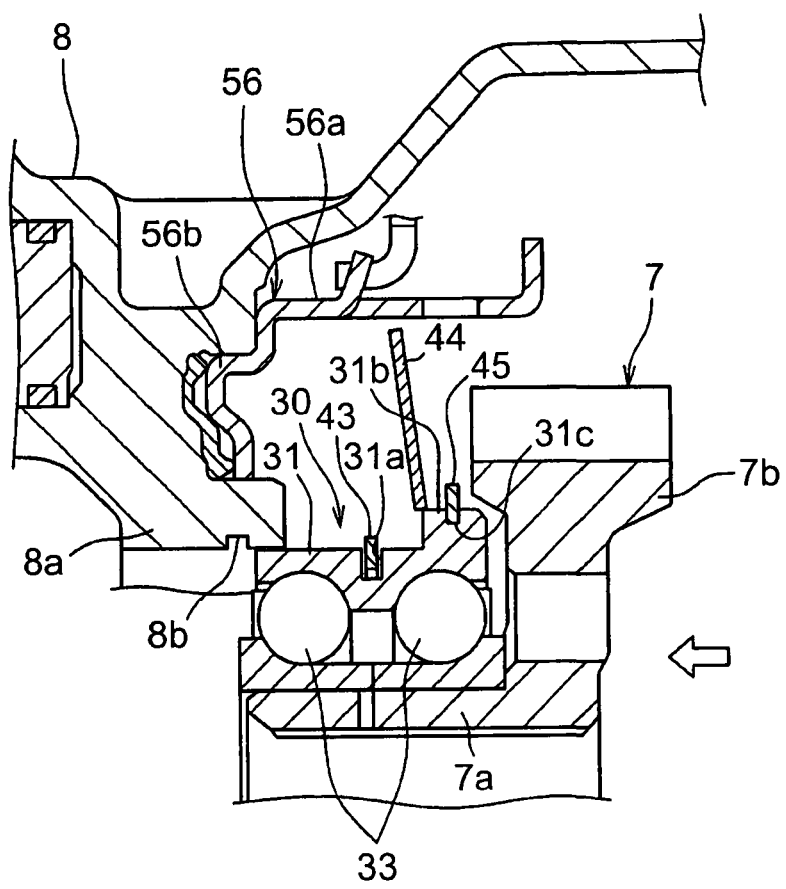
FIG. 4 is a view that illustrates a second stage subsequent to FIG. 3.
Figure 5:
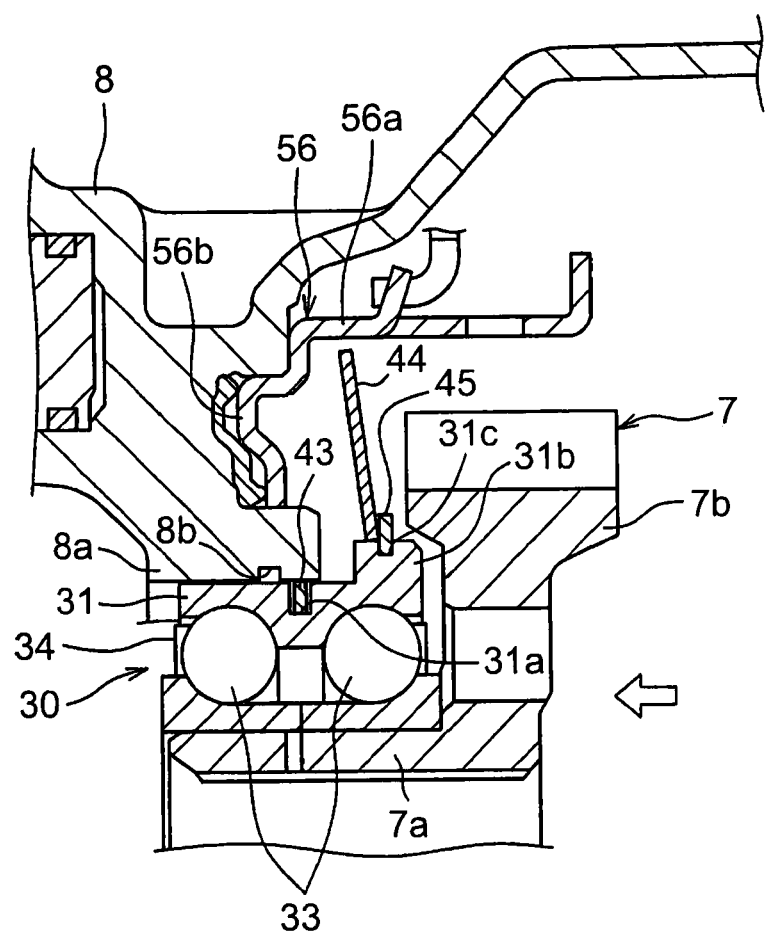
FIG. 5 is a view that illustrates a third stage subsequent to FIG. 4.

Subsequently, as illustrated in FIG. 4, the diameter of the first retaining ring 43 is reduced again to fit the outer ring 31 into the cylindrical portion 8a of the transmission case 8. Thus, the first retaining ring 43 settles in a state where the first retaining ring 43 does not protrude into the outer circumferential groove 31a. Further, when the first retaining ring 43 that is attached to the outer ring 31 reaches the position of the inner circumferential groove 8b of the cylindrical portion 8a as the outer ring 31 is pressed in, the first retaining ring 43 elastically restores and increases the diameter. Consequently, an outer diameter side portion of the first retaining ring 43 fits in the inner circumferential groove 8b of the cylindrical portion 8a of the transmission case 8. In this state, the first retaining ring 43 fits in the outer circumferential groove 31a and the inner circumferential groove 8b in a state where the first retaining ring 43 has a slight axial direction gap and radial direction gap with respect to the outer circumferential groove 31a and the inner circumferential groove 8b, respectively.

The third brake 53 that is disposed on a lateral side of the output gear 7 has friction plates 53a on the inner diameter side and friction plates 53b on the outer diameter side. The friction plates 53a on the inner diameter side are fitted to the outer circumference of the ring gear 11 of the first gear shift portion 10 by way of spline fitting. The friction plates 53b on the outer diameter side are fitted to a predetermined region of a member 57 that is fixed to the transmission case 8 by way of spline fitting. The third brake 53 is disposed such that the output gear 7 is located between the radial bearing 30 and the third brake 53.

This third brake 53 is placed in a brake actuated state by applying a pressure by the piston 56. Further, when the piston 56 stopped applying the pressure to the third brake 53, the piston 56 is urged in a direction opposite to the pressure applying direction by a spring force of the return spring 44. Then, this third brake 53 is placed in a brake released state.

In addition, this operation that the piston 56 applies the pressure to the third brake 53 is controlled by applying or stopping applying a hydraulic pressure to the hydraulic cylinder that is not illustrated.

The piston 56 has a bottomed cylindrical shape, and takes a transverse posture (disposed) such that the center line of the piston 56 is coaxial with respect to a center line of the input shaft 6. This piston 56 is fitted to an exterior of the cylindrical portion 8a (the support region of the radial bearing 30) in the transmission case 8 to slide in the axial direction.

In the present embodiment, a device to lock a second retaining ring 45 that retains a return spring 44, in the outer ring 31 of the radial bearing 30 is made. Details will be described below.

A ring piece 31b that protrudes outward in the radial direction is provided on the shaft direction one end side in the outer circumferential surface of the outer ring 31. An outer diameter dimension of this ring piece 31b is set larger than an inner diameter dimension of the cylindrical portion 8a of the transmission case 8 and slightly smaller than or to the same dimension as the outer diameter dimension of the cylindrical portion 8a. Thus, the ring piece 31b of the outer ring 31 is placed in contact with the end surface of the cylindrical portion 8a of the transmission case 8 in a state where the outer ring 31 is located with respect to the cylindrical portion 8a of the transmission case 8 by the first retaining ring 43 in the axial direction. That is, the ring piece 31b is placed in contact with the output gear side end surface of the cylindrical portion 8a of the transmission case 8 in the shaft direction.

Further, an outer circumferential groove 31c that locates the second retaining ring 45 is provided in the outer circumferential surface of the ring piece 31b of the outer ring 31.

The return spring 44 is, for example, a disk spring, and the outer rim of the return spring 44 is placed in contact with the vicinity of a corner between a cylindrical portion 56a and a bottom portion 56b of the piston 56. Further, the return spring 44 is placed in contact with the second retaining ring 45 that is locked in the outer circumferential groove 31a of the outer ring 31 in a state where an inner rim of the return spring 44 is fitted to the outer circumferential surface of the ring piece 31b of the outer ring 31 of the radial bearing 30.

The second retaining ring 45 is generally called a snap ring. This snap ring has a circumference and elastically expands and contracts. One portion of the circumference is disconnected.

A mode to assemble the second retaining ring 45 that is called a snap ring will be described. The diameter of the second retaining ring 45 is increased to expand a gap of a disconnected portion and fit the second retaining ring 45 in the outer circumferential groove 31c of the outer ring 31. Thus, the diameter of the second retaining ring 45 is reduced by an elastic restoring force, and the second retaining ring 45 contacts the groove bottom of the outer circumferential groove 31c. Consequently, the second retaining ring 45 does not easily get out of the outer circumferential groove 31c.

In addition, the second retaining ring 45 is fitted to the outer circumferential groove 31c in a state where the second retaining ring 45 has a slight axial direction gap with respect to the outer circumferential groove 31c.

Further, the ring piece 31b is provided in the outer circumference of the outer ring 31 in this way, and therefore the axial direction dimension of the cylindrical portion 8a of the transmission case 8 is reduced by the axial direction dimension of this ring piece 31b. That is, the shaft direction dimension of the cylindrical portion 8a of the transmission case 8 in the present embodiment is made short compared to that disclosed in JP 2007-132421 A. In view of this, the axial direction length dimension that is required to support the output gear 7 in the present embodiment can be set to the same as that in JP 2007-132421 A and does not need to be intentionally made longer.

In the present embodiment, the transmission case 8 is made of aluminum alloy to reduce the weight of the transmission case 8. Further, the outer ring 31 of the radial bearing 30 is made of ferrous metal (such as bearing steel) to secure sufficient strength. Furthermore, the first retaining ring 43 and the second retaining ring 45 are made of ferrous metal to secure sufficient strength.

When this configuration is employed, the thrust force (see the left side in FIG. 2) that is produced when the output gear 7 that includes the outer teeth that are teeth of the helical gear rotates acts on the radial bearing 30 that is fitted to an exterior of and fixed to the cylindrical boss portion 7a of the output gear 7.

Then, the ring piece 31b of the outer ring 31 of the radial bearing 30 is pressed against the end surface of the cylindrical portion 8a of the transmission case 8. That is, the thrust force that is produced by the output gear 7 is received by the cylindrical portion 8a of the transmission case 8 through the ring piece 31b of the outer ring 31 of the radial bearing 30.

Consequently, the thrust force does not act or acts little on the first retaining ring 43. Consequently, even when the transmission case 8 is made of aluminum alloy to reduce the weight of the transmission case 8 and when the first retaining ring 43 is made of ferrous metal to secure strength, the inner circumferential groove 8b of the cylindrical portion 8a of the transmission case 8 in which the first retaining ring 43 is locked is not easily abraded over time.

Further, according to the above configuration, a reaction force of an urging force applied from the return spring 44 to the piston 56 acts on the second retaining ring 45. The mode that the second retaining ring 45 is locked in the outer circumferential groove 31c of the ring piece 31b of the outer ring 31 that is made of ferrous metal having high strength compared to aluminum alloy is adopted. Consequently, even when the second retaining ring 45 is made of ferrous metal to secure strength, the outer circumferential groove 31c of the ring piece 31b of the outer ring 31 is not easily abraded over time compared to a mode that, for example, the second retaining ring 45 is locked by the cylindrical portion 8a of the transmission case 8 (e.g. JP 2007-132421 A).

As described above, according to the embodiment to which the present invention is applied, it is possible to prevent abrasion of locking grooves (the outer circumferential groove 31a of the outer ring 31 and the inner circumferential groove 8b of the transmission case 8) for the first retaining ring 43 that locates the radial bearing 30, and abrasion of a locking groove (the outer circumferential groove 31c of the ring piece 31b of the outer ring 31) for the second retaining ring 45 that retains the return spring 44. Consequently, it is possible to prevent durability of the transmission case 8 from lowering.

Moreover, according to the present embodiment, when a configuration that prevents abrasion of the locking grooves for the first retaining ring 43 and the second retaining ring 45 is employed, it is possible to set the axial direction length dimension that is required to support the output gear 7 to the same as that disclosed in JP 2007-132421 A, and make a device not to make the axial direction length dimension unintentionally large. Consequently, it is not necessary to change dimensions and dispositions of components of the automatic transmission 3.

In addition, the present invention is not limited to the above embodiment, and can be optionally changed within a range of the claims and a range equivalent to the range of the claims.

An example has been described with the above embodiment where the radial bearing 30 is a double row angular contact ball bearing. The present invention is not limited to this, and the radial bearing 30 may be other types of radial bearings.

An example has been described with the above embodiment where the automatic transmission 3 according to the present invention is the front engine front drive (FF) type. The present invention is not limited to this. For example, although not illustrated, the present invention is applicable to an automatic transmission of a front engine rear drive (FR) type, and an automatic transmission of a midship type.

The present invention can be suitably used for an automatic transmission that employs a configuration where a cylindrical boss portion that protrudes in a direction in which a thrust force of an output gear is produced is rotatably supported by a cylindrical portion of a transmission case through a radial bearing, and friction engaging elements that control gear shifting are disposed on a side opposite to the direction in which the thrust force is produced in the output gear.

The invention claimed is:

1. An automatic transmission comprising:
   an output gear;
   a radial bearing;
   a transmission case that includes a cylindrical portion;
   a cylindrical boss portion configured to be supported by the cylindrical portion through the radial bearing to rotate, the cylindrical boss portion being configured to protrude from the output gear to a direction in which a thrust force of the output gear is produced;
   a friction engaging element disposed such that the output gear is located between the radial bearing and the friction engaging element;
   a piston configured to apply a pressure that causes the friction engaging element to be engaged, the piston being disposed on an outer diameter side of the cylindrical portion of the transmission case, and the piston being disposed to slide in an axial direction of the transmission case;
   a first retaining ring disposed between a first outer circumferential groove that is provided in an outer circumferential surface of the radial bearing, and an inner circumferential groove that is provided in an inner circumferential surface of the cylindrical portion of the transmission case;
   a ring piece provided to an outer ring of the radial bearing, the ring piece being configured to protrude outward in a radial direction, and the ring piece being in contact with an output gear side end surface of the cylindrical portion of the transmission case in the axial direction;
   a second retaining ring configured to lock in a second outer circumferential groove that is provided in an outer circumferential surface of the ring piece; and
   a return spring disposed at the outer circumferential surface of the ring piece, the return spring being configured to urge the piston in a direction opposite to a direction in which the pressure is applied by the piston when the piston stops applying the pressure that causes the friction engaging element to be engaged, and the return spring being configured to retain in the axial direction by the second retaining ring.

2. The automatic transmission according to claim 1, wherein
the radial bearing is a double row angular contact ball bearing,
the first outer circumferential groove is disposed in center of the outer circumferential surface of the radial bearing in the axial direction,
the output gear includes outer circumferential teeth that are teeth of a helical gear, the cylindrical boss portion is coaxially disposed on an outer diameter side of an input shaft,
the piston includes a bottomed cylindrical shape with a center line that is coaxially disposed with respect to a center axial line of the input shaft,
the return spring is a disk spring with an outer rim, and an inner rim of the return spring is in contact with the second retaining ring.

3. The automatic transmission according to claim 1, wherein
strength of the ring piece is higher than strength of the cylindrical portion of the transmission case.

4. The automatic transmission according to claim 2, wherein
the outer rim is in contact with a vicinity of a corner between the cylindrical portion of the piston and a bottom portion of the piston.

5. The automatic transmission according to claim 1, wherein
the return spring is a disk spring with an outer rim that is in contact with a vicinity of a corner between the cylindrical portion of the piston and a bottom portion of the piston.

* * * * *